United States Patent
Weinberg

Patent Number: 5,390,558
Date of Patent: Feb. 21, 1995

[54] CONTINUOUSLY VARIABLE TRANSMISSION

[76] Inventor: Morgan W. Weinberg, 108 3rd St., N.E., Washington, D.C. 20002

[21] Appl. No.: 55,322

[22] Filed: May 3, 1993

[51] Int. Cl.⁶ ............................................. F16H 29/04
[52] U.S. Cl. ........................................... 74/124; 74/119
[58] Field of Search ............... 475/169, 170, 183, 185, 475/186, 296, 297, 298; 74/124, 123, 122, 119, 118

[56] References Cited

U.S. PATENT DOCUMENTS

| | | |
|---|---|---|
| 954,453 | 4/1910 | Morse . |
| 1,306,330 | 6/1919 | Drew . |
| 1,497,445 | 6/1924 | Janssen ................... 74/124 |
| 2,066,758 | 1/1937 | Bassoff . |
| 2,159,739 | 5/1939 | Johnson ................... 74/124 |
| 2,510,749 | 6/1950 | Lotts ....................... 74/124 |
| 2,554,463 | 5/1951 | Klamp ..................... 74/124 |
| 3,087,355 | 4/1963 | Bassereau . |
| 3,442,157 | 5/1969 | Novinger . |
| 4,909,101 | 3/1990 | Terry, Sr. . |
| 4,936,155 | 6/1990 | Gogins ..................... 74/124 |

FOREIGN PATENT DOCUMENTS

| | | | |
|---|---|---|---|
| 556492 | 4/1923 | France ................... 74/124 |
| 25410 | 11/1907 | United Kingdom ........ 74/124 |

*Primary Examiner*—Edward K. Look
*Assistant Examiner*—James A. Larson
*Attorney, Agent, or Firm*—Richard C. Litman

[57] ABSTRACT

An input shaft includes a cam configured to have a variable diameter profile. An oscillating arm tracks the cam profile. Oscillating motion of the arm is converted by roller clutches back to rotary motion. Speed variation is accomplished by moving the arms axially so that they contact the cam at points of varying cam diameter. The cam is configured to eliminate torque surges at all speed ratios, resulting in smooth delivery of torque under all conditions. An appropriate cam surface providing this result is disclosed.

12 Claims, 6 Drawing Sheets

CONTINUOUSLY VARIABLE TRANSMISSION

BACKGROUND OF THE INVENTION

1. Field of the Invention

The present invention relates to a continuously variable speed ratio transmission wherein rotary motion is converted to oscillating motion, wherein one way roller clutches convert the oscillations back to unidirectional rotary motion.

2. Description of the Prior Art

Continuously variable transmissions (hereinafter referred to as CVT) have long been known. Some early examples, not of great relevance but illustrating basic planetary gear arrangements, include U.S. Pat. No. 954,453, issued to Arthur J. Morse on Apr. 12, 1910; U.S. Pat. No. 1,306,330, issued to William F. Drew on Jun. 10, 1919; U.S. Pat. No. 2,066,758, issued to Arthur B. Bassoff on Jan. 5, 1937; and U.S. Pat. No. 3,442,157, issued to Harry E. Novinger on May 6, 1969.

Of greater relevance are those CVT designs which convert oscillating motion of an eccentric member to unidirectional motion, and which provide separate means to vary eccentricity of this member. U.S. Pat. No. 3,087,355, issued to Roger J. J. Bassereau on Apr. 30, 1963, discloses a continuously variable transmission employing rectification of bidirectional rotation. Rectification is performed by a pawl and ratchet wheel assembly. Variation is accomplished by moving a plate to a condition of greater and lesser eccentricity with respect to an input shaft. However, the Bassereau invention is subject to surges in torque, or rippling. Rippling occurs as a result of the ratchet clutch driver being accelerated to a momentary peak value and then decelerated, torque being applied to the planetary gear through only a few degrees of rotation. The inventor's solution to this problem is to maximize the number of certain parts ("bearing ring 5", with reference to column 2, lines 6–8 of '355). While this solution mitigates the problem, it does not actually eliminate ripples.

U.S. Pat. No. 4,909,101, issued to Maurice C. Terry on Mar. 20, 1990, is a second example of rectified motion. Terry '101 employs overrunning clutches, as does the present invention, to accomplish rectification, in lieu of pawl and ratchet. The important function of addressing rippling is provided by neoprene members (see column 8, lines 50–63 of '101). This arrangement is seen to mitigate, by damping, such rippling, but, again, does not actually eliminate rippling.

None of the above inventions and patents, taken either singly or in combination, is seen to describe the instant invention as claimed.

SUMMARY OF THE INVENTION

Prior art CVTs suffer in two ways related to rippling. The first is that torque is not transmitted continuously and smoothly, but rather in sharp, intermittent pulses. This stresses all mechanical components, and is unacceptable, particularly in high speed and high torque applications.

Secondly, torque is transmitted along only one path in prior art devices. This limits the net capacity of the transmission to the capacity of the weakest component in the path.

In the CVT of the present invention, a plurality of torque arms each having a cam follower oscillate in response to a cam profile of a cam slidably mounted on a rotary input shaft. Each torque arm pivots or partially rotates a torque arm shaft which also supports a planetary output gear. Roller clutches interposed between the torque arm shaft and the output gear rectify oscillating motion to unidirectional motion. The output of a plurality of torque arms, now rectified to motion in one direction, is imposed on a sun gear keyed to an output shaft.

Speed variation is accomplished by axial movement of the cam on its associated input shaft. The cam followers, which are fixed relative to the cam, contact the cam at varying degrees of eccentricity as the cam is moved axially. Greater eccentricity increases rotation of the torque arms, and consequently of the torque arm shafts and output gears. Thus, output to the sun gear is increased for each rotation of the input shaft, and output gear ratio is increased relative to input shaft rotation.

A function of providing a neutral gear is provided by configuring the cam to have an area of non-eccentricity. At this point, the cam followers, and thus the torque arms, are not displaced axially. There is no motion thus being passed on to the output gears, and the input shaft can then rotate without any corresponding rotation of the output shaft. Neutral is thus provided without employing additional parts and without imposing wear on a clutch.

A major advance in the apt is elimination of rippling at all speed ratios. The cam profile is designed to enable the cam followers to modify their acceleration such that rippling is eliminated, insofar as is possible within manufacturing tolerances. This is in contrast to the prior art, which copes with ever-present rippling, rather than truly eliminating the same.

A major advantage of a cam profile so designed, in combination with the elements described above, is that only one member, the cam, need be designed and manufactured with great precision. This may be contrasted to the manufacture of gears in assuring a close yet interference free fit between gear teeth in the following way. Each tooth of a gear must be machined to have a desired profile, and each tooth of a second gear must also be machined. Thus, two precision machining operations are required to provide a pair of mutually compatible gears. In the present invention, precision design and machining, or manufacturing by any suitable process, are required for but one member.

Accordingly, it is a principal object of the invention to provide a CVT wherein an eccentric member imparts oscillating motion to a rocking member, and wherein oscillation is rectified to unidirectional rotation.

It is another major object of the invention to eliminate rippling throughout the entire range of speed ratios.

It is an additional object of the invention to transmit power through a plurality of torque arm and associated components simultaneously, whereby the transmission of the present invention has an increased torque rating for a given size thereof.

Yet another object of the invention is to provide shafts supporting torque arms which shafts are rotatably fixed with respect to the transmission housing, and thus are not subjected to centrifugal forces.

It is a further object of the invention to provide apparatus eliminating rippling which requires precision design and manufacturing of but a single member.

Still another object of the invention is to provide gear ratio variation by apparatus which varies eccentricity acting on the rocking member.

It is yet another object of the invention to vary eccentricity acting on the rocking member by urging a single part to move linearly.

An additional object of the invention is to provide a cam follower which always maintains tangential contact with the cam.

It is still an additional object of the invention to provide a neutral gear ratio, wherein no rotation is imposed on the output member when the input member is rotating, requiring no additional parts.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
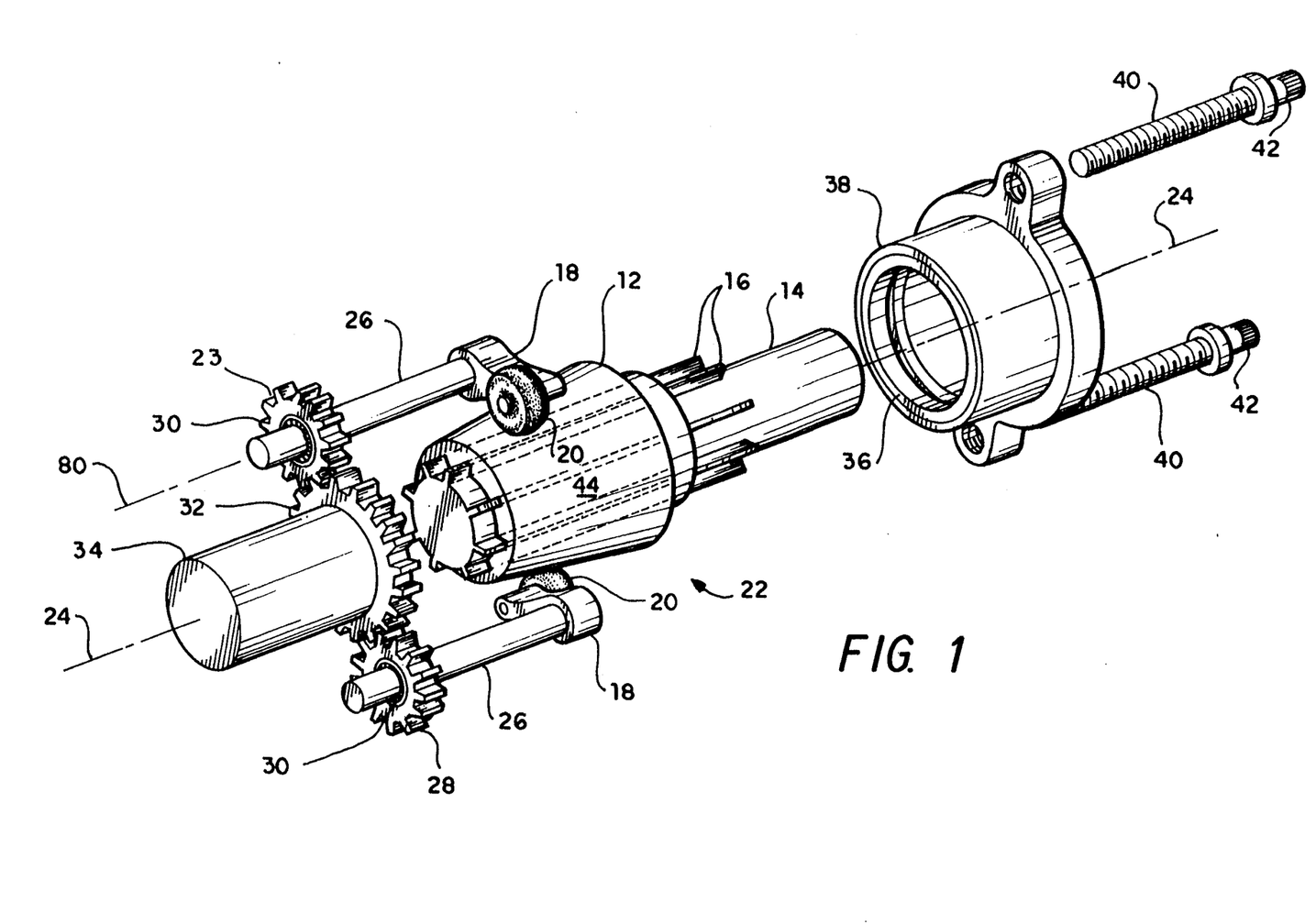
FIG. 1 is a perspective detail view of the major moving parts of the novel transmission.

The major moving components of the present invention are shown isolated from the assembled novel transmission 10 in FIG. 1. A cam 12 having an outer surface 44 is slidably mounted on input shaft 14, secured against relative rotation by splines 16. A plurality of torque arms 18 bear against the cam 12 at surface 44, actual contact being made by rotatable cam followers 20. As a raised portion 22 of the cam 12 passes by a torque arm 18, the torque arm 18 rocks or oscillates away and then back toward the input shaft axis 24. A rotatable clutch shaft 26 having an axis 80 supports torque arm 18, and is keyed thereto, thus causing clutch shaft 26 to rotate alternately in opposing directions.

An output gear 28 is mounted on clutch shaft 26. A roller clutch 30 is fitted between clutch shaft 26 and output gear 28. This roller clutch 30 rectifies alternate rotational motion to unidirectional motion, thereby driving the output gear 28 in only one direction. All torque arms 18 and associated output gears 28 impose their motion collectively on a sun gear 32 which is fixed to an output shaft 34.

Output speed ratio is varied by sliding cam 12 axially along input shaft 14. A contact bearing 36 mounted on a carrier 38 engages cam 12, and is adjustable to pull and push cam 12 along input shaft 14. Screws 40 rotatably secured to the transmission housing (not shown in this view) move carrier 38, and thus cam 12, axially when rotated. Splines 42 are shown to indicate connection to a rotating controller for adjusting cam axial position. Any suitable controlling device (not shown) may be employed to adjust screws 40.

Figures 2, 4, 5:
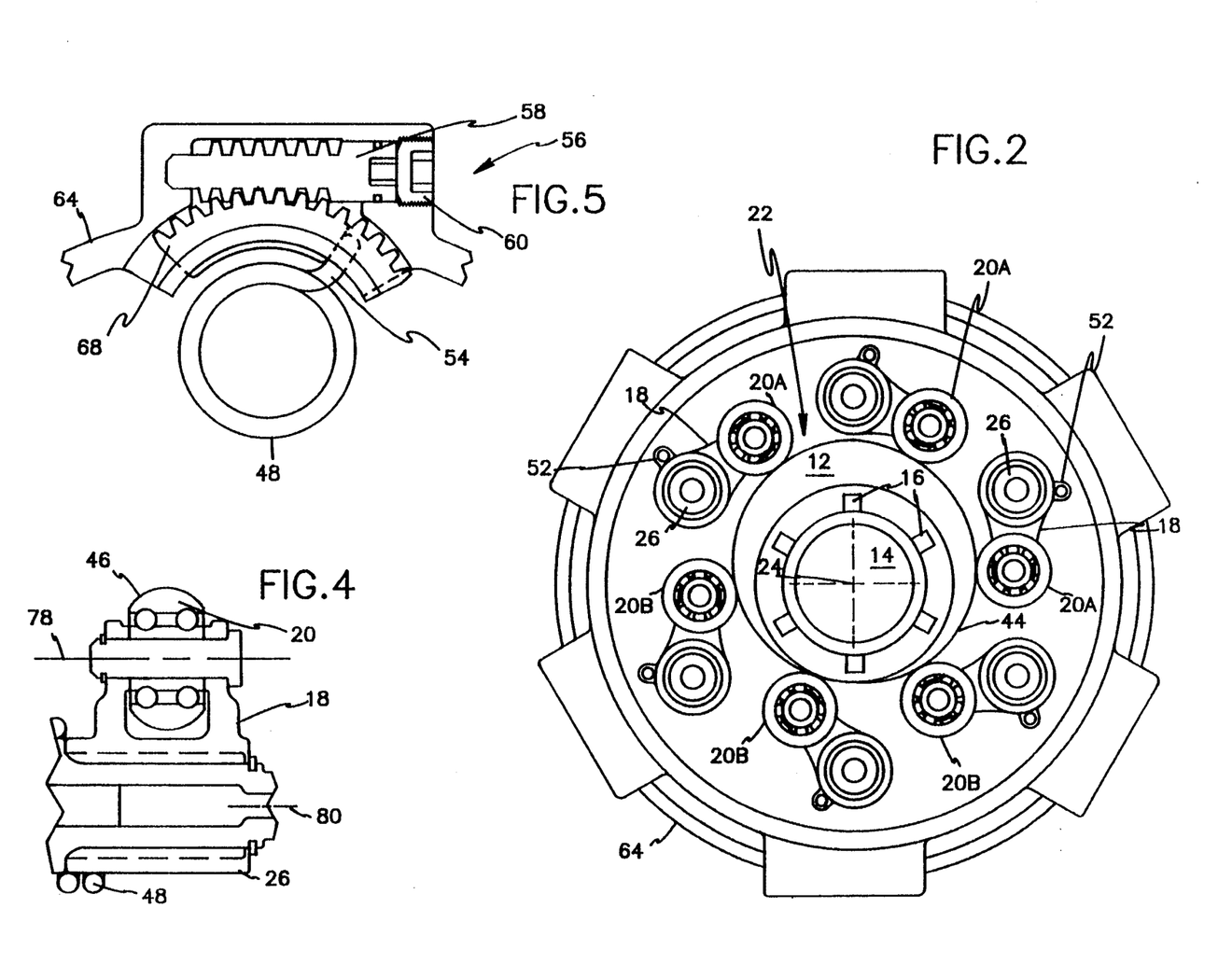
FIG. 2 is a rear cross sectional detail view of the novel transmission, illustrating the cam followers.
FIG. 4 is a cross sectional detail view of a cam follower.
FIG. 5 is a cross sectional detail view of a cam follower spring and associated tension adjustment mechanism.

Turning to FIG. 2, the action of cam 12 on torque arms 18 will be explained in greater detail. Cam followers 20A,20A are shown in a position maximally displaced from input shaft axis 24, and cam followers 20B,20B are shown relatively close to axis 24. Cam outer surface 44 is seen to be eccentric to axis 24 and substantially round, actual configuration being explained further hereinafter. Because cam outer surface 44 approximates a partial cone, cam followers 20 must have a round cross sectional surface 46 in order to maintain tangential contact therewith. This round surface 46 is seen in greater detail in FIG. 4.

Figure 3:
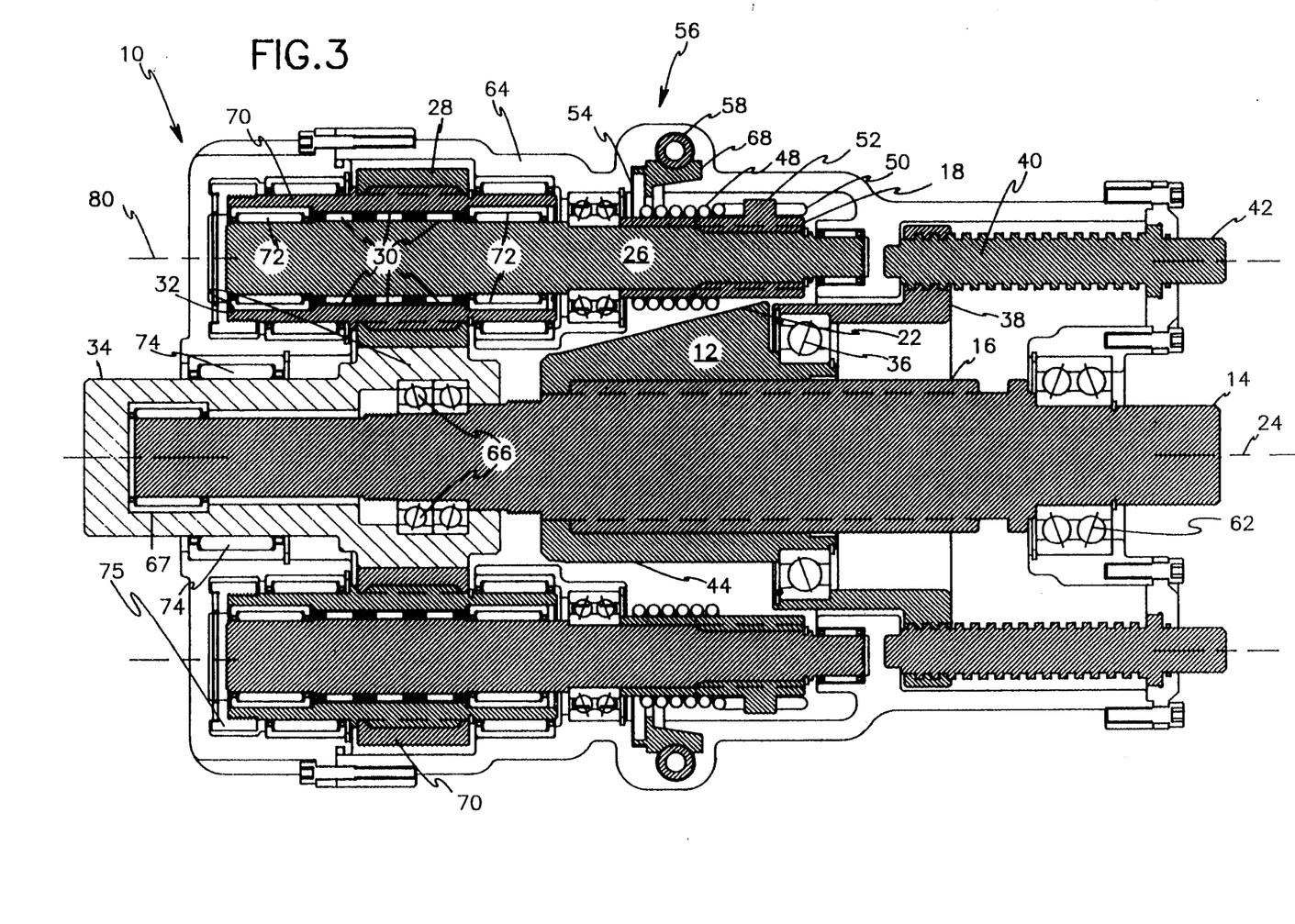
FIG. 3 is a side cross sectional detail view of the novel transmission.

Cam followers 20 are biased against cam 12 by springs 48. As seen in FIG. 3, a spring 48 is arranged concentrically around clutch shaft 26, a first end 50 engaging torque arm 18 at tab 52 (also shown in FIG. 2) and a second end 54 being substantially fixed to the transmission housing 64 (housing 64 is shown in FIG. 3). The fixed end 54 engages one member of a worm and rack gear arrangement 56 (see FIG. 5). Tension on spring 48 is adjusted by turning worm gear 58, which cooperates with gear 68 and is supported in transmission housing 64. A cap 60 locks worm gear 58 in housing 64, and also provides an oil seal.

As shown in FIG. 3, a preferred embodiment is discussed. Input shaft 14 is supported at one end on angled bearings 62, which accommodate both axial and radial loads, and maintain axial location. Bearings 62 are supported in transmission housing 64. At the other end of input shaft 14 is supported by angular contact bearings 66 and needle bearings 67. Cam 12 rides on input shaft 14, and is engaged by carrier 38 through contact bearing 36. Carrier 38 is adjusted fore and aft by screws 40.

Torque arm 18 is supported on and splined to rotatable clutch shaft 26. Torque arm 18 and cam followers 20 are omitted from FIG. 3 for clarity.

A large, hollow shaft 70 is mounted concentrically around clutch shaft 26. Both clutch shaft 26 and hollow shaft 70 are supported on concentrically arranged needle bearings 72. Between clutch shaft 26 and hollow shaft 70 are disposed three roller clutches 30. Clutch shaft 26 rotates alternately in response to oscillation of torque arm 18, and this motion is rectified to unidirectional motion, so that hollow shaft 70 is driven in only one direction. Hollow shaft 70 is keyed to drive output gear 28, which, in turn, engages sun gear 32. Sun gear 32 is integral with output shaft 34, or may alternatively be keyed thereto. Output shaft 34 is supported on needle bearings 74 and angular contact bearings 66.

As sun gear 32 and output gears 28 are helical sets, bearings 66 are angled to absorb thrust imparted to sun gear 32 by output gears 28. Thrust imparted to output gears 28 is accommodated by needle thrust bearings 75 through hollow shaft 70.

As mentioned earlier, the primary objectives of the invention are to eliminate ripples in the transmission output and to transmit power through plural paths simultaneously, paths being defined by torque arms 18 and associated components, at each possible output ratio. These objectives are achieved through the interaction of cam followers 20, which rotate torque arms 18 proportionally, and of cam 12. Cam 12 is generally conical, as seen in FIG. 1, and varying in eccentricity, from a point of maximum eccentricity ECM to zero eccentricity. A neutral gear exists at zero eccentricity. There exists a point EC of maximum eccentricity at each point along cam 12, each point defining an individual speed ratio. Each cam follower 20 oscillates in a plane 76 (see FIG. 7) which is normal to input shaft axis 24. As cam 12 is moved axially through plane 76, the eccentricity displacing cam followers 20 is varied.

Cam 12 is characterized by four partial profiles, Profile B being that portion of cam outer surface 44 (see FIG. 8) which lifts a cam follower 20 away from axis 24, a return profile 88 which enables cam follower 20 to return to its original position prior to being lifted, and two transition profiles 86,87 which bridge profiles B and 88. Although partial profile B is depicted as occupying one half of the entire circumference of cam outer surface 44, it must be understood that profile B may occupy more or less than one half of the circumference of cam 12.

Profile B is the active profile lifting cam followers 20 and, in turn, causing clutch shafts 26 to rotate in the direction which engage roller clutches 30, thus driving planetary gears 28. Profile B is derived such that as cam 12 rotates at constant angular velocity, all cam followers 20 contacting Profile B rotate their corresponding clutch shafts 26 also at constant angular velocity, such angular velocity being a function of maximum eccentricity EC at plane 76. Preferably, Profile B occupies sufficient degree of rotation so as to contact more than one cam follower 20 at once, this being shown in FIG. 2.

When this situation occurs, torque load will be divided among all clutch shafts 26 and roller clutches 30, the associated torque arms 18, and cam followers 20 of which are in contact with Profile B at any one instant. In the preferred embodiment, as depicted in FIG. 2, three clutch shafts 20A,20A,20A are transmitting torque through their respective output gears 28 to sun gear 32.

Profile B, in performing the dual functions of engaging more than one follower at a time and of rotating each follower corresponding clutch shaft at an angular velocity, variably and always linearly proportionally to the input shaft angular velocity, accomplishes the two primary objectives. These are elimination of ripples and transmission of power through plural paths simultaneously, these objectives being served at all speed ratios.

In the present invention, plural clutch shafts are transmitting torque at any one point in time. There is no time when one clutch is engaged while another clutch is beginning to engage, which would cause a temporary disruption to torsional force. Also, clutch shaft velocity does not peak at a momentary value, but rather maintains the same angular velocity, with respect to input shaft velocity, throughout the driving phase. Thus torque transmission is free of pulses, spikes, or rippling. This is achieved at all speed ratios by pairing each speed ratio with a corresponding, unique profile B.

Figure 8:
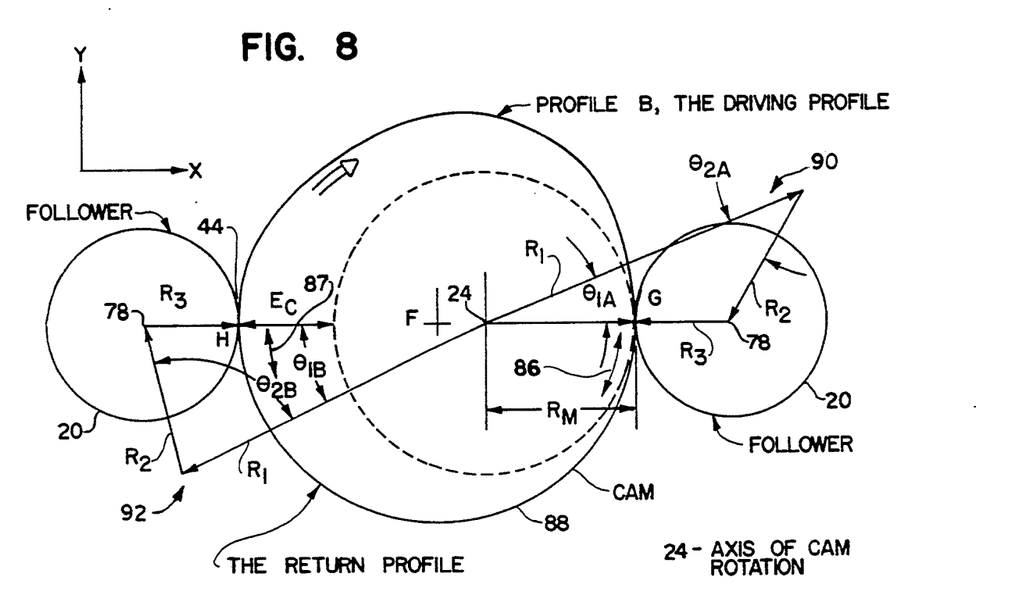

Areas 86,87 of transition are configured to be smooth and continuous with profiles B and 88. Transition area 86 accelerates clutch shaft 26 to a particular angular velocity maintained throughout profile B, while transition area 87 decelerates clutch shaft 26. Decelerated clutch shaft 28 is now prepared for a new acceleration cycle upon new contact with profile B. As illustrated, transition areas 88,87 as occupying roughly 20 degrees of arc, and return profile 88 is shown as being substantially semicircular, having center point F.

The sections of cam outer surface 44 describing a transition from lifting to return are configured to be smooth and continuous, whereby the acceleration, displacement, and velocity curves of cam followers 20 are continuous throughout a single cam rotation.

In generating a preferred cam profile, a unique and distinctive curve is produced for each point of maximum eccentricity. Each a function of axial displacement of cam 12 along axis 24, these curves combine to describe cam surface 44 in Cartesian coordinates, and are derived by the following iterative process.

Figure 6:
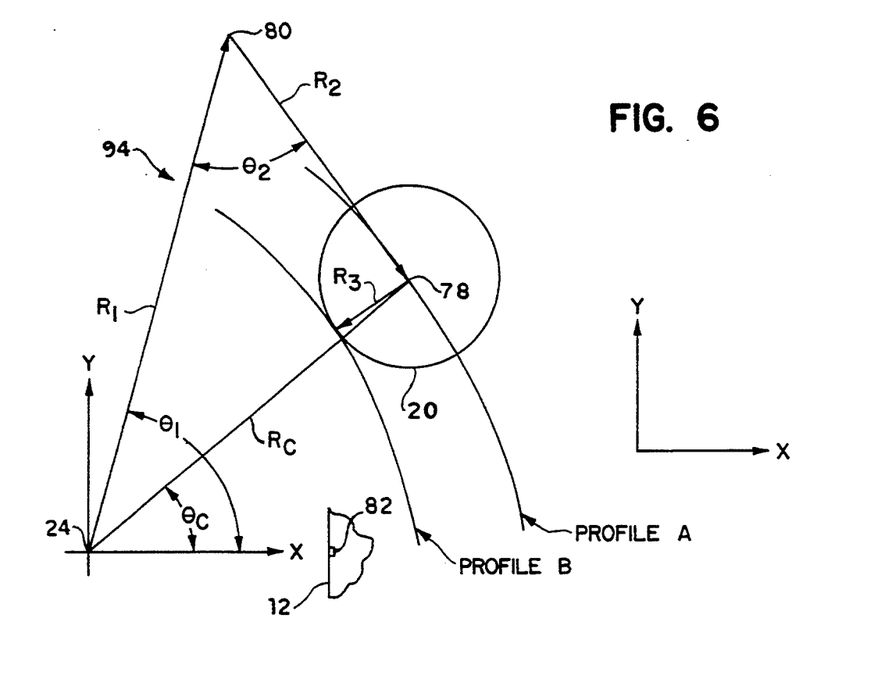
FIGS. 6–10 are geometric representations of components of the novel transmission, showing relationships thereamong.

Referring first to FIG. 6, Profile A is a curve which would be generated by travel of the center point, or rotational axis 78 (best seen in FIG. 4), of cam follower 20 as it completes a revolution about cam 12. $R_1$ is the distance between axis 24 of the input shaft 14 and axis 80 (see FIG. 3) of clutch shaft 26. $R_2$ is the distance between the axis 80 of the clutch shaft 26 and axis 78 of the cam follower 20. $R_3$ is a maximum radius of cam follower 20, with respect to axis 78 (see FIG. 7). $R_C$ represents the distance between axis 24 of the input shaft 14 and axis 78 of cam follower 20. $R_1$, $R_2$, and $R_3$ are constants. $\theta_1$ represents an angle of clutch shaft rotation about axis 24, particularly considered with respect to an arbitrary benchmark 82 defined on a portion of cam 12. $\theta_C$ is an angle existing between $R_C$ and benchmark 82.

$\theta_2$ represents an angle of clutch shaft rotation about its axis 80 existing between $R_1$ and $R_2$. The rate of change of $\theta_2$, being equal to the angular velocity of output gear 28, will be the controlling factor in the derivation of the preferred cam profile such that as cam 12 rotates at some angular velocity, the rate of change of $\theta_2$ will be constant with respect to that cam angular velocity (the rate of change of $\theta_1$).

The ratio of the rate of change of $\theta_2$ with respect to the rate of change of $\theta_1$ equals K.

Figure 7:
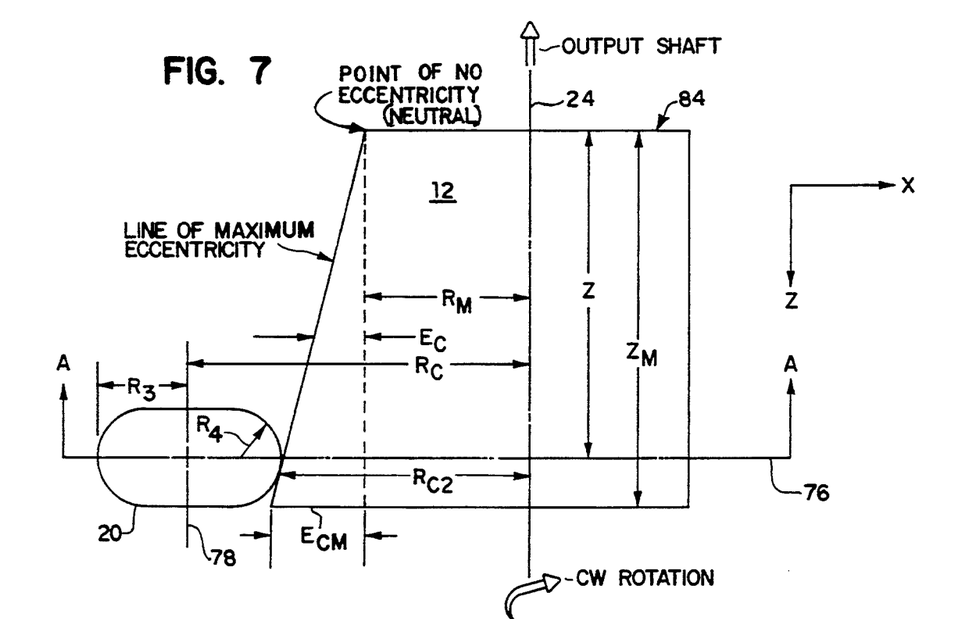

Turning now to FIG. 7, which shows a cross section of cam 12 and a single cam follower 20 at an arbitrary axial displacement Z, where Z is defined as a distance from cam proximal end 84 to a plane 76 normal to cam follower axis 78 and bisecting cam follower 20. In FIG. 7, a line of maximum eccentricity of cam 12 is indicated. Note that maximum eccentricity EC of cam 12 at any given Z varies linearly as a function of Z. For any other degree of cam rotation, a corresponding line of eccentricity will not be straight, and that cam 12 will not appear trapezoidal, as shown herein and in the side elevational view of FIG. 3.

$R_4$ represents the cross sectional radius of cam follower 20. $R_{C2}$ is the actual distance between a contact point P of cam follower 20 and cam axis of rotation 24.

ECM is the maximum eccentricity at the maximum value of Z,ZM.

In FIG. 8, a cam follower 20 is shown at the beginning of its drive stroke and again at the end thereof. From the geometry presented in FIG. 8, K is determined as a function of maximum eccentricity EC. Profile B represents the actual surface of cam 12 that will determine cam follower displacement during the lift stroke, and, thus, will generate the constant angular velocity (rate of change of $\theta_2$) of clutch shaft 26, as cam 12 rotates at constant angular velocity (rate of change of $\theta_1$). As cam 12 rotates about axis 24 of rotation, a starting point G designates the beginning of Profile B, and H represents the arbitrary end point thereof (point of maximum eccentricity). Note that Profile B, between G and H, is non-circular.

Angle GH is an angle existing between the starting point G and arbitrary end point H of Profile B. The depiction of FIG. 8 shows GH as 180 degrees, but, in alternative embodiments, other angles could be selected.

Distance $R_M$ is a radius of cam 12 at minimal eccentricity. $\theta_{1A}$ is the angle between $R_1$ and benchmark 82 (see FIG. 6) when the cam follower 20 is at point G. $\theta_{2A}$ is the angle between $R_1$ and $R_2$ when the cam follower 20 is at point G. $\theta_{1B}$ is an angle between benchmark 82 (see FIG. 6) and $R_1$ when the cam follower 20 is at H. $\theta_{2B}$ is the angle between $R_1$ and $R_2$ when the cam follower 20 is at H.

As mentioned earlier, the fundamental principle of the novel transmission 10 is that as the cam 12 rotates at a constant angular velocity (rate of change of $\theta_1$), the cam follower 20 will rotate clutch shaft 26 at a constant angular velocity (rate of change of $\theta_2$). This relation is embodied in Equation 1.

$$\frac{d\theta_2}{dt} = k \frac{d\theta_1}{dt}$$

Equation 1

Integrating both sides of Equation 1, as shown in Equation 2, yields Equation 3.

$$\int d\theta_2 = k \int d\theta_1$$

Equation 2

$$\theta_2 = k\theta_1 + \phi$$

Equation 3

$\phi$ is a constant which will be explained hereinafter. From Equation 3 it can be derived that the change in $\theta_2$ equals K times the change in $\theta_1$, as embodied in Equation 4.

$$\Delta\theta_2 = k\Delta\theta_1$$

Equation 4

From the law of cosines as applied to a triangle 90 (see FIG. 8), Equation 5 is derived.

$$\theta_{2A} = \cos^{-1}\left[\frac{-[[R_m + R_3]^2 - R_1^2 - R_2^2]}{2R_1R_2}\right]$$

Equation 5

From the law of sines as applied to triangle 90, Equation 6 is derived.

$$\theta_{1A} = \sin^{-1}\left[\frac{R_2}{[R_m + R_3]} \sin\theta_{2A}\right]$$

Equation 6

Referring again to FIG. 7, the relationship between maximum eccentricity EC and distance Z is embodied in Equation 7.

$$E_c = \frac{E_{cm}}{Z_m} \cdot Z \quad \{E_c = f(Z)\}$$

Equation 7

From the law of cosines, as applied to triangle 92 (see FIG. 8), Equation 8 is derived.

$$\theta_{2B} = \cos^{-1}\left[\frac{-[[R_m + R_3 + E_c]^2 - R_1^2 - R_2^2]}{2R_1R_2}\right]$$

Equation 8

From the law of sines, as applied to triangle 92, Equation 9 is derived.

$$\theta_{1B} = \sin^{-1}\left[\frac{R_2}{[R_m + R_3 + E_c]} \sin\theta_{2B}\right]$$

Equation 9

The change in $\theta_1$ (delta $\theta_1$) over the entire sweep of Profile B from point G to point H is embodied in Equation 10.

$$\Delta\theta_1 = \angle GH - \theta_{1A} + \theta_{1B}$$

Equation 10

The change in $\theta_2$ (delta $\theta_2$) over the entire sweep of Profile B is embodied in Equation 11.

$$\Delta\theta_2 = \theta_{2B} - \theta_{2A}$$

Equation 11

From the relation indicated in Equation 4, K can be determined from substitution of Equations 10 and 11 into Equation 4. This is summarized in Equation 12, which yields K as a function of Z and angle GH.

$$K = \frac{\theta_{2B} - \theta_{2A}}{\angle GH - \theta_{1A} + \theta_{1B}} \quad \{K = F(Z, \angle GH)\}$$

Equation 12

For a given K, the constant $\phi$ from Equation 2 can easily be determined by substituting Equations 5 and 6, indicated in Equation 13.

$$\theta_2 = K\theta_1 + \phi \rightarrow \phi = \theta_{2A} = K\theta_{1A}$$

Equation 13

Distance $R_C$ may be quantified as a function of $\theta_1$. Recalling Equation 3, $\theta_2$ can be determined as a linear function of $\theta_1$.

$$\theta_2 = k\theta_1 + \phi$$

Equation 3

From the law of cosines, as applied to triangle 94 (see FIG. 6), Equation 14 is derived.

$$R_c^2 = R_1^2 + R_2^2 - 2R_1R_2 \cos\theta_2$$

Equation 14

By substituting (K) ($\theta_1$) and ($\phi$) for $\theta_2$, as related in Equation 3, Equation 15 is derived. Equation 15 shows $R_C$ as a function of $\theta_1$, K, and $\phi$.

$$R_C = [R_1^2 + R_2^2 - 2R_1R_2 \cos [K\theta_1 + \phi]]^{\frac{1}{2}}$$

Equation 15

From the law of sines, as applied to triangle 94, Equation 16 is derived. Equation 16 shows $\theta_C$ as a function of $\theta_1$, K, and $\phi$.

$$\theta_c = \theta_1 - \sin^{-1}\left[\frac{R_2}{R_c}\sin[K\theta_1 + \phi]\right]$$

Equation 16

Having derived $R_C$ and $\theta_C$, which combine to generate a curve scribed by the axis of cam follower 20 as it sweeps across Profile B, it is necessary to derive the formula describing cam outer surface 44, as contacted by cam follower 20.

The following derivations will determine the actual cam profile, Profile B, which will position cam follower axis 78 relative to the input shaft axis 24 at distance $R_C$ at an angle $\theta_C$. Since $R_C$ and $\theta_C$ are functions of the angle of cam rotation $\theta_1$, $\phi$, and K, and are readily determined for any given transmission geometry, the equations generating Profile B will be written as functions of $R_C$, $\theta_C$ and Z.

Figure 9:
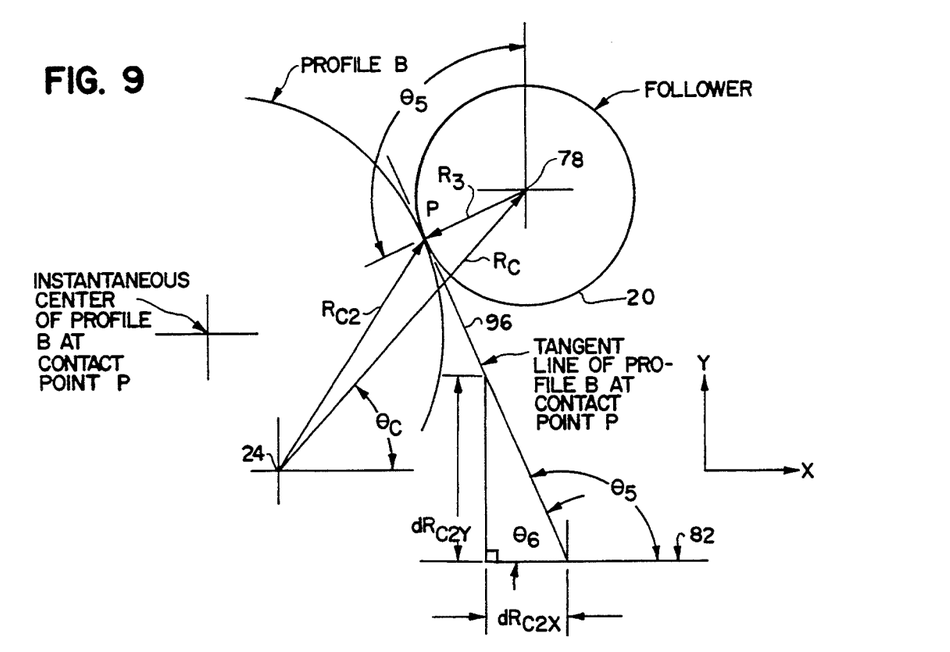

FIG. 9 shows a cam follower 20 in contact with cam outer surface 44, where outer surface 44 is configured to reflect Profile B. Note that in this figure, cam follower 20 is shown without any thickness such that radius R3 lies in the same plane as contact point P. $R_{C2}$ is the distance from input shaft axis 24 to a point of contact P between cam follower 20 and Profile B. $\theta_5$ is the angle between the tangent line of Profile B at point P and benchmark 82 (see FIG. 6).

$R_{C2}$ is a vector determined by adding vectors $R_C$ and $R_3$, which operation yields Equations 17 and 18. $R_{C2X}$ is the component of $R_{C2}$ in the x-axis direction, and $R_{C2Y}$ is the component of $R_{C2}$ in the y-axis direction.

$$R_{c2x} = R_c \cos \theta_c + R_3 \cos[\theta_5 + 90]$$

Equation 17

$$R_{c2y} = R_c \sin \theta_c + R_3 \sin[\theta_5 + 90]$$

Equation 18

Equations 17 and 18 reduce to Equations 19 and 20.

$$R_{c2x} = R_c \cos \theta_c - R_3 \sin \theta_5$$

Equation 19

$$R_{c2y} = R_c \sin \theta_c + R_3 \cos \theta_5$$

Equation 20

Note that $\theta_5$ is not yet calculated. $R_{C2X}$ and $R_{C2Y}$ are determined by first estimating $\theta_5$. Using the temporary values thus derived, the slope of the line tangent to Profile B at point P, line 96, is determined by calculating the following limits, wherein $R_{C2Y}'$ is the derivative of $R_{C2Y}$ at point P, and $R_{C2X}'$ is the derivative of $R_{C2X}$ at point P.

$$R_{c2y'} = \frac{dR_{c2y}}{d\theta_c} = \lim_{\Delta\theta_c \to 0} \frac{R_{c2y}\{\theta_c + \Delta\theta_c\} - R_{c2x}\{\theta_c\}}{\Delta\theta_c}$$

Equation 21

$$R_{c2x'} = \frac{dR_{c2x}}{d\theta_c} = \lim_{\Delta\theta_c \to 0} \frac{R_{c2x}\{\theta_c + \Delta\theta_c\} - R_{c2x}\{\theta_c\}}{\Delta\theta_c}$$

Equation 22

In calculating $R_{C2}\{\theta_C + \Delta\theta_C\}$, $R_C$ is computed for the new angle $\theta_C + \Delta\theta_C$, wherein $\Delta\theta_C$ is an infinitesimal change in $\theta_C$. Equations 18 and 19 reduce to corresponding Equations 23 and 24, due to the slope of Profile A at the cam follower's center point being equal to the slope of Profile B at contact point P.

$$R_{c2y'} = \lim_{\Delta\theta_c \to 0} \frac{R_c\{\theta_c + \Delta\theta_c\}\sin(\theta_c + \Delta\theta_c) - R_c\{\theta_c\}\sin\theta_c}{\Delta\theta_c}$$

Equation 23

$$R_{c2x'} = \lim_{\Delta\theta_c \to 0} \frac{R_c\{\theta_c + \Delta\theta_c\}\cos(\theta_c + \Delta\theta_c) - R_c\{\theta_c\}\cos\theta_c}{\Delta\theta_c}$$

Equation 24

The ratio of $R_{C2Y'}$ is taken with respect to $R_{C2X'}$, yielding the slope of line 96, as embodied in equation 25.

$$\frac{dR_{c2y}}{dR_{c2x}} = \frac{R_{c2y'}}{R_{c2x'}}$$

Equation 25

$\theta_5$ is then determined by adding the inverse tangent of this slope to 180 degrees, as embodied in Equation 26.

$$\theta_5 = 180° + \tan^{-1}\left[\frac{R_{c2y'}}{R_{c2x'}}\right]$$

Equation 26

This value of $\theta_5$ will then be substituted back into Equations 19 and 20, and the iteration will continue until $\theta_5$ converges.

$$R_{c2x} = R_c \cos \theta_c - R_3 \sin \theta_5$$

Equation 19

$$R_{c2y} = R_c \sin \theta_c + R_3 \cos \theta_5$$

Equation 20

Figure 10:
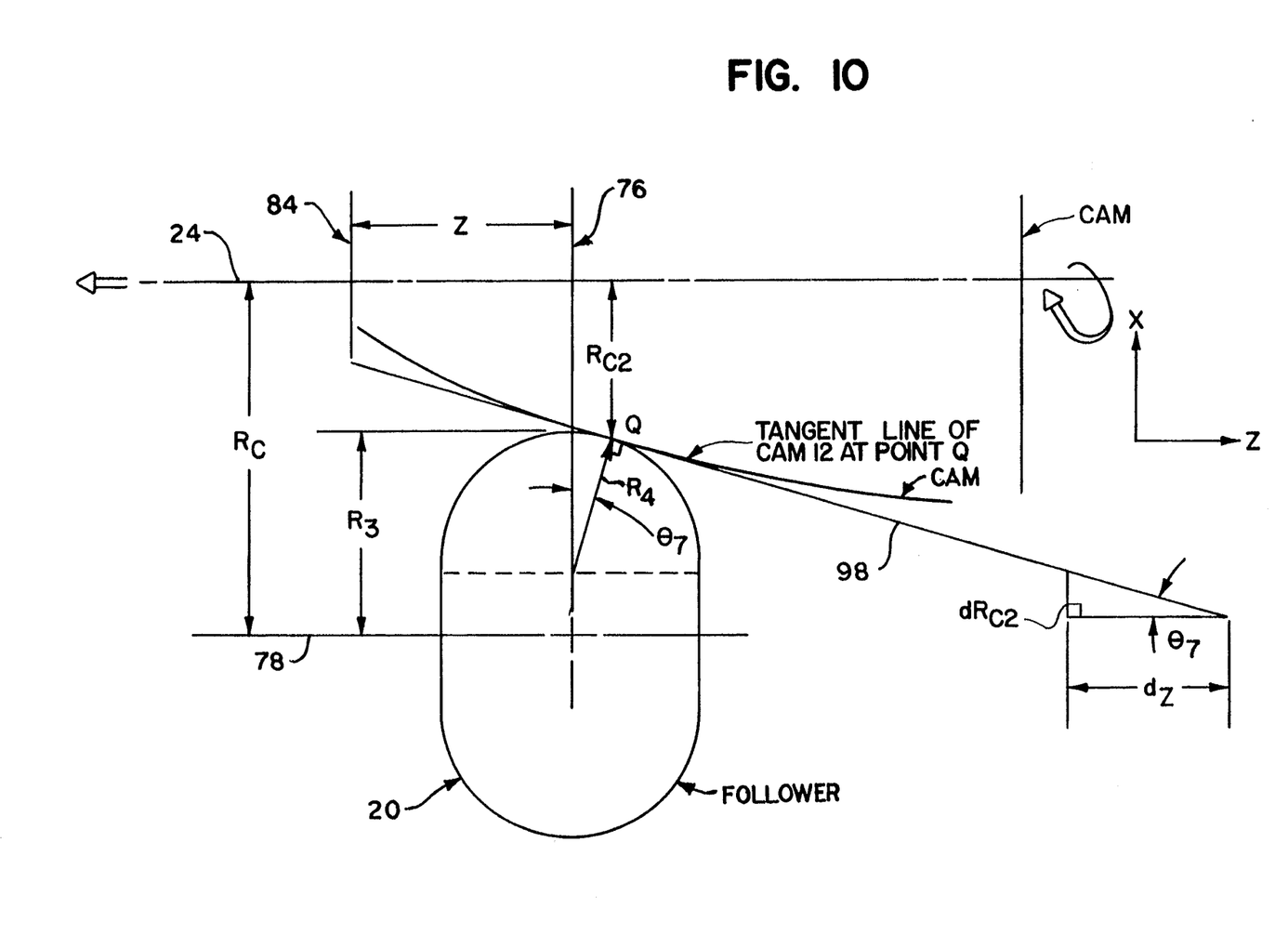

As seen in FIGS. 1 and 4, cam follower 20 is torroidal. In FIG. 10, cam follower 20, shown in section, contacts cam 12 at a point Q. $\theta_1$ is the angle between the tangent line of cam 12 at point Q, line 98, and input shaft axis 24.

Equations 19 and 20 calculate $R_{C2X}$ and $R_{C2Y}$, the respective x and y components of $R_{C2}$ for a planar follower having no depth, and not as a toroid. In the case of a planar follower, the contact point Q of cam follower 20 would be at distance Z. As the profile of the actual cam follower 20 is round, the actual point of contact between cam follower 20 and cam 12 is not truly at distance Z, but at a greater distance. Furthermore, the perpendicular displacement between cam follower rotational axis 78 and contact point Q is not equal to $R_3$; it is less than $R_3$. These discrepancies are accounted for in the following equations which determine $R_{C2X}$ and $R_{C2Y}$ for a toroidal cam follower 20 at any given Z. Since cam follower location is known for any given Z through equations 15 and 16, then cam outer surface 44 must be determined such that it touches cam follower outer surface 46 at contact point Q.

It will be noticed in FIG. 10 that the $R_{C2}$ will define a profile B if rotated about axis 24. If broken down into X and Y components, $R_{C2X}$ and $R_{C2Y}$ cam outer surface is readily determined in Cartesian coordinates by calculating $R_{C2X}$ and $R_{C2Y}$ through some distance Z.

$R_{C2}$ is derived by subtracting the perpendicular distance from the cam follower rotational axis 78 to contact point Q from $R_C$, as embodied in Equations 27 and 28.

$$R_{c2x}[Z+R_4 \sin \theta_7] = R_c[\theta_o Z] \cos \theta_c - [R_3 - R_4[1-\cos \theta_7]] \sin \theta_5$$

Equation 27

$$R_{c2y}[Z+R_4 \sin \theta_7] = R_c[\theta_o Z] \sin \theta_c - [R_3 - R_4[1-\cos \theta_7]] \cos \theta_5$$

Equation 28

In general, equations 27 and 28 are modified forms of equations 19 and 20, taking into account the toroidal geometry of cam follower 20. $R_{C2X}[Z+R_4 \sin \theta_7]$ is the value of $R_{C2X}$ at distance $Z+R_4 \sin \theta_7$ from proximal end 84. $R_{C2Y}[Z+R_4 \sin \theta_7]$ is the value of $R_{C2Y}$ at distance $Z+R_4 \sin \theta_7$ from proximal end 84. $R_C[\theta_C, Z]$ is the value of $R_C$ at angle $\theta_C$ at distance Z from proximal end 84. $\theta_5$ is determined by solving equations 23, 24, 25, and 26 for $R_C$ at distance $Z+R_4 \sin \theta_7$ at angle $\theta_C$. Given that $\theta_7$ is uncalculated at this point, its value is estimated. $R_{C2}$ is determined by application of the Pythagorean theorem to $R_{C2X}$ and $R_{C2Y}$, as determined by solving Equations 27 and 28, which result is embodied in Equation 29.

$$R_{c2} = [R_{c2x}^2 + R_{c2y}^2]^{\frac{1}{2}}$$

Equation 29

The slope of the tangent line at point Q is determined by application of a limit, as embodied in Equation 30.

$$\frac{dR_{c2}}{dZ} = \lim_{\Delta Z \to 0} \frac{R_{c2}\{\theta_{c'} Z + \sin\theta_7 R_4 + \Delta Z\} - R_{c2}\{\theta_{c'} Z + \sin\theta_7 R_4\}}{\Delta Z}$$

Equation 30

In Equation 30, $R_{C2}\{\theta_C, Z+\sin \theta_7 R_4+\Delta Z\}$ equals $R_{C2}$ as calculated in Equation 29, for angle $\theta_C$ at distance $Z+\sin \theta_7 R_4+\Delta Z$ from line 76, where $\Delta Z$ is an infinitesimal change in Z. $\theta_7$ is then determined by taking the inverse tangent of the slope of line 98 as computed in Equation 31, seen below.

$$\theta_7 = \tan^{-1}\left[\frac{dR_{c2}}{dZ}\right]$$

Equation 31

This value for $\theta_7$ is then substituted back into equations 23, 24, and 26, thus yielding a new value for $\theta_5$ at angle $\theta_C$ and distance $Z+R_4 \sin \theta_7$ from line 76. Then new values for $\theta_5$ and $\theta_1$ are then substituted into Equations 27 and 28. Equation 29 yields a new value for $R_{C2}$ at distance $Z+R_4 \sin \theta_7$. The new value of $R_{C2}$ is substituted into Equations 30 and 31, thus yielding a new value for $\theta_7$. The iteration process is repeated until $\theta_5$, $\theta_7$, $R_{C2X}$ and $R_{C2Y}$ converge. At the point of convergence, $R_{C2X}$ and $R_{C2Y}$ are determined for the selected $\theta_C$ and Z. As $\theta_C$ is a function of $\theta_1$ and Z, the profile of cam outer surface 44 can be quantified by varying $\theta$ and Z throughout the range extending from their respective minimum to maximum values.

From this iterative process, a preferred cam outer surface 44 can be determined for any transmission geometry.

The novel transmission is preferably equipped with six torque arms 18, as shown in FIG. 2. Roller clutches 30 ape preferably arranged three in tandem on each clutch shaft 26, as shown in FIG. 3. The transmission provides for simultaneous engagement of plural torque arms and respective output gears with an output shaft throughout all speed ratios, thus enabling smooth transmission of high torque values fop the size of components.

The resultant transmission provides continuous and infinite variation of input to output speed ratios from a neutral condition to a maximum ratio, and completely eliminates destructive torque ripple at all ratios. An exemplary transmission of dimensions shown in the accompanying drawings could bear the load imposed by relatively small automotive engines in production today, and a transmission of only slightly greater dimensions could serve any automotive engine currently in production serving retail consumers. Composed of relatively few moving parts mounted in a compact package, the transmission is also applied to all types of machinery wherein large torques must be transmitted from an input shaft to an output shaft at varying speed ratios.

It is to be understood that the present invention is not limited to the embodiments described above, but encompasses any and all embodiments within the scope of the following claims.

I claim:

1. A continuously variable transmission including input shaft means receiving rotary input motion from an external power source, cam means having an eccentric cam outer surface, said cam means being slidably mounted on said input shaft means so as to be axially movable thereon, means to move said cam means axially along said input shaft means, output means for receiving motion from said cam means and for converting said motion to a rotary output motion, said output means comprising:

at least one torque arm means, a rotatable shaft means for each said at least one torque arm means rotatably supporting said at least one torque arm means thereon, said at least one torque arm means having cam follower means contacting said cam outer surface, said cam outer surface causing said cam follower means to oscillate when said cam means is rotated, said at least one torque arm means having a proximal end and a distal end, said proximal end being rigidly fixed to said rotatable shaft means and said distal end rotatably supporting said cam follower means, whereby said at least one torque arm means is caused to oscillate in and through a predetermined arc, said rotatable shaft means thus being caused to rotate alternately in opposing directions; and output gear means mounted on said rotatable shaft means, said output gear means comprising one-way clutch means supported on said rotatable shaft means for rectifying alternating rotational motion in opposing directions into unidirectional rotational motion, gear means rotatably supported about said rotatable shaft means and being driven in unidirectional rotational motion by said one-way clutch means, and sun gear means receiving motion from said gear means, whereby all motion being transmitted by each and all gear means is imposed collectively upon said sun gear means;

said input shaft means having an internal axis of rotation, said cam follower means defining a torus having an internal axis of rotation, said torque arm means predetermined arc defining a plane of reference, wherein said cam outer surface is configured to assume a curve defining Cartesian coordinates generated by the equations:

$$R_{c2x}[Z+R_4 \sin \theta_7] = R_c[\theta_o \ Z] \cos \theta_c - [R_3 - R_4[1-\cos \theta_7]] \sin \theta_5$$

and $$R_{c2y}[Z+R_4 \sin \theta_7] = R_c[\theta_o \ Z] \sin \theta_c - [R_3 - R_4[1-\cos \theta_7]] \cos \theta_5$$

and $$R_{c2} = [R_{c2x}^2 + R_{c2y}^2]^{\frac{1}{2}}$$

wherein
- $R_{C2}$ is displacement of said cam follower means from said input shaft means axis of rotation;
- Z is linear displacement of said cam means with respect to said plane of reference, and forming one of three Cartesian axes including an x-axis, a y-axis, and a z-axis, wherein there are defined an x-y plane; an x-z plane, and a y-z plane;
- $R_{C2X}$ and $R_{C2Y}$ describe said cam outer surface in Cartesian coordinates as a function of said Z;
- $\theta_C$ is an angle determined between said x-axis and a line spanning said input shaft means internal axis and said cam follower means internal axis, said line lying within the y-x plane;
- $\theta_7$ is an angle lying in the x-z plane and defined between a line tangent to said cam outer surface at a point of contact between said cam outer surface and said cam follower means and the z-axis;
- $\theta_5$ is an angle lying in the y-x plane and defined between a line tangent to said cam outer surface at a point of contact between said cam outer surface and said cam follower means, and the x-axis;
- $R_C$ is the distance between said input shaft means internal axis and said cam follower means internal axis;
- $R_3$ is a maximum radius of said cam follower means about said internal axis thereof to an outer surface of said cam follower means; and
- $R_4$ is the internal radius of said torus.

2. The continuously variable transmission according to claim 1, wherein said cam outer surface is configured in a predetermined manner to modify acceleration of said cam followers means such that rippling is eliminated at all effective output ratios.

3. The continuously variable transmission according to claim 1, wherein said cam outer surface is configured to include a portion having zero eccentricity, thus providing a neutral gear.

4. The continuously variable transmission according to claim 1, said cam follower means including a round surface contacting said cam means, whereby said cam follower means maintains tangential contact with said cam means.

5. The continuously variable transmission according to claim 1, further including means urging said cam follower means into rolling and abutting engagement with said cam means.

6. The continuously variable transmission according to claim 5, further including means for adjusting tension of said means urging said cam follower means into engagement with said cam means.

7. A continuously variable transmission including input shaft means receiving rotary input motion from an external power source, cam means having an eccentric cam outer surface, said cam means being slidably mounted on said input shaft means so as to be axially movable thereon, means to move said cam means axially along said input shaft means, output means for receiving motion from said cam means and for converting said motion to a rotary output motion, said output means comprising:

at least one torque arm means, a rotatable shaft means for each said at least one torque arm means rotatably supporting said at least one torque arm means thereon, said at least one torque arm means having cam follower means contacting said cam outer surface, said cam outer surface causing said cam follower means to oscillate when said cam means is rotated, said at least one torque arm means having a proximal end and a distal end, said proximal end being rigidly fixed to said rotatable shaft means and said distal end rotatably supporting said cam follower means, whereby said at least one torque arm means is caused to oscillate in and through a predetermined arc, said rotatable shaft means thus being caused to rotate alternately in opposing directions; and output gear means mounted on said rotatable shaft means, said output gear means comprising one-way clutch means supported on said rotatable shaft means for rectifying alternating rotational motion in opposing directions into unidirectional rotational motion, gear means rotatably supported about said rotatable shaft means and being driven in unidirectional rotational motion by said one-way clutch means, and sun gear means receiving motion from said gear means, whereby all motion being transmitted by each and all gear means is imposed collectively upon said sun gear means, said cam means defining thereon an arbitrary benchmark, against which said benchmark angular rotation is defined, said input shaft means having an axis of rotation and rotating at an angular velocity, each of said cam follower means having an internal axis of rotation and tangentially contacting said cam means, and each of said torque arm means having an axis of rotation, wherein said cam outer surface is configured to drive said cam follower means arcuately and oscillatingly about respective said torque arm means axis of rotation at constant angular velocity, whereby rotational velocity of said torque arm means about said torque arm means axis of rotation, as a function of said input shaft angular velocity, is defined by the equation $$\frac{d\theta_2}{dt} = k \frac{d\theta_1}{dt}$$

wherein
- $d\theta_2/dt$ is the angular velocity of rotation of said torque arm means about the axis of rotation thereof;
- $d\theta_1/dt$ is the angular velocity of rotation of said input shaft means about said axis of rotation thereof;
- k is a constant which is varied as axial displacement of said cam means is varied; and
- wherein the degree of angular rotation of said torque arm means about said torque arm means axis of rotation as a function of said input shaft rotation is defined by the equation $$\theta_2 = k\theta_1 + \phi$$

wherein $\theta_2$ is a first angle existing between a first line extending from said input shaft axis of rotation to said torque arm means axis of rotation, and a second line extending between said torque arm means axis of rotation and said cam follower means internal axis of rotation, which said first angle defines an angle of torque arm means rotation;

$\theta_1$ is a second angle existing between said first line and a third line extending between said input shaft axis of rotation and said benchmark, which said second angle defines input shaft rotation;

$\phi$ is an arbitrary angle providing a constant of integration; and wherein position of said cam follower means internal axis of rotation with respect to said input shaft axis of rotation as a function of said input shaft rotation is defined by the equations:

$$R_c = [R_1^2 + R_2^2 - 2R_1R_2 \cos[K\theta_1 + \phi]]^{\frac{1}{2}}$$

and $$\theta_c = \theta_1 - \sin^{-1}\left[\frac{R_2}{R_c} \sin[K\theta_1 + \phi]\right]$$

wherein $R_1$ is a distance existing between said input shaft axis of rotation and said torque arm means axis of rotation;

$R_2$ is a distance existing between said torque arm means axis of rotation and said cam follower means internal axis of rotation;

$R_c$ is displacement of said cam follower means internal axis of rotation from said input shaft axis of rotation; and $\theta_c$ is an angle existing between $R_c$ and said third line, wherein $R_c$ and $\theta_c$ define a position of said cam follower means internal axis of rotation as a function of k and said input shaft angle of rotation, said input shaft angle of rotation also being designated $\theta_1$, said cam outer surface being derived such that constant tangential contact with said cam follower means is maintained as said cam follower means internal axis of rotation is positioned at $R_c$ and $\theta_c$.

8. The continuously variable transmission according to claim 7, wherein said cam outer surface is configured in a predetermined manner to modify acceleration of said cam follower means such that rippling is eliminated at all effective output ratios.

9. The continuously variable transmission according to claim 7, wherein said cam outer surface is configured to include a portion having zero eccentricity, thus providing a neutral gear.

10. The continuously variable transmission according to claim 7, said follower means including a round surface contacting said cam means, whereby said cam follower means maintains tangential contact with said cam means.

11. The continuously variable transmission according to claim 7, further including means urging said cam follower means into rolling and abutting engagement with said cam means.

12. The continuously variable transmission according to claim 7, further including means for adjusting tension of said means urging said cam follower means into engagement with said cam means.

* * * * *